United States Patent
Molnar

[11] Patent Number: 5,881,448
[45] Date of Patent: Mar. 16, 1999

[54] METHOD FOR MAKING PERMANENT MAGNET ROTOR

[75] Inventor: David T. Molnar, Fort Wayne, Ind.

[73] Assignee: General Electric Company, Schenectady, N.Y.

[21] Appl. No.: 486,765

[22] Filed: Jun. 7, 1995

Related U.S. Application Data

[60] Continuation-in-part of Ser. No. 292,470, Aug. 18, 1994, which is a division of Ser. No. 17,533, Feb. 16, 1993, Pat. No. 5,345,129, which is a continuation-in-part of Ser. No. 863,900, Apr. 6, 1992.

[51] Int. Cl.⁶ ..................................................... H02K 15/04
[52] U.S. Cl. ................................. 29/598; 29/732; 310/42; 310/156
[58] Field of Search ............................ 29/598, 596, 732, 29/736; 310/42, 153, 156, 216–218, 89, 90

[56] References Cited

U.S. PATENT DOCUMENTS

| | | |
|---|---|---|
| 3,531,670 | 9/1970 | Loudon . |
| 3,707,037 | 12/1972 | Gutris . |
| 4,088,177 | 5/1978 | Armstrong et al. . |
| 4,126,933 | 11/1978 | Anderson et al. . |
| 4,137,884 | 2/1979 | Odazima et al. . |
| 4,219,752 | 8/1980 | Katon . |
| 4,327,479 | 5/1982 | Futterer et al. . |
| 4,404,483 | 9/1983 | Lebkuchnar ........................... 310/90 X |
| 4,433,261 | 2/1984 | Nashiki et al. . |
| 4,466,165 | 8/1984 | Otto . |
| 4,501,983 | 2/1985 | Schmider ............................... 310/89 X |
| 4,510,679 | 4/1985 | Aleem et al. . |
| 4,586,244 | 5/1986 | Muller . |
| 4,587,721 | 5/1986 | Muller . |
| 4,617,726 | 10/1986 | Denk . |
| 4,631,435 | 12/1986 | McCarty . |
| 4,633,113 | 12/1986 | Patel . |
| 4,682,066 | 7/1987 | Abbratozzato et al. . |
| 4,713,877 | 12/1987 | Abbott et al. . |
| 4,742,259 | 5/1988 | Schaefer et al. . |
| 4,746,827 | 5/1988 | Ochiai et al. . |
| 4,801,834 | 1/1989 | Stokes . |
| 4,877,986 | 10/1989 | Shimizu . |
| 4,910,861 | 3/1990 | Dohogne . |
| 4,954,736 | 9/1990 | Kawamoto et al. . |
| 5,040,286 | 8/1991 | Stark . |

FOREIGN PATENT DOCUMENTS

| | | |
|---|---|---|
| 0143693 | 6/1985 | European Pat. Off. . |
| 909472 | 4/1954 | Germany . |
| 2641536 | 12/1977 | Germany . |
| 57-206260 | 12/1982 | Japan . |
| 63-64556 | 3/1988 | Japan . |
| 64-81634 | 3/1988 | Japan . |
| 63-265554 | 11/1988 | Japan . |
| 2052319 | 1/1981 | United Kingdom . |

*Primary Examiner*—Carl E. Hall
*Attorney, Agent, or Firm*—Welsh & Katz, Ltd.; Wayne O. Traynham; Enrique J. Mora

[57] ABSTRACT

A permanent magnet rotor includes a core and a plurality of magnetizable elements held about the outer circumferential surface of the core, as by an adhesive. The core and magnetizable elements are cold-pressed into a deep drawn cup-shaped outer metallic shell having a substantially closed end wall and an opposite open end defined by a peripheral edge which is rolled over the periphery of an end plate to encapsulate the core and magnetizable elements within the shell. An insulator disk is preferably disposed between each end of the core and the adjacent shell end wall and end plate. The permanent magnet rotor may be formed by a methond and apparatus that cold press the core and magnetizable elements into the cup-shaped shell and form the peripheral edge of the shell over the end plate to effect encapulation.

8 Claims, 4 Drawing Sheets

FIG_1

FIG_2

FIG_3

FIG_4

FIG_8

METHOD FOR MAKING PERMANENT MAGNET ROTOR

This is a continuation-in-part from application Ser. No. 292,470 filed Aug. 18, 1994, which is a division from Ser. No. 17,533 filed Feb. 16, 1993, U.S. Pat. No. 5,345,129, which is a continuation-in-part from pending application Ser. No. 863,900, filed Apr. 6, 1992, all of which are incorporated herein by reference.

BACKGROUND OF THE INVENTION

The present invention relates generally to permanent magnet rotors, and more particularly to a novel permanent magnet rotor employing a deep drawn cup or shell and a method for encapsulating into the shell a core having magnetizable elements held about the circumference of the core.

Permanent magnet rotors for electronically commutated motors (ECMs) typically are constructed of a generally cylindrical iron core, which may be of a solid or sintered metal construction or may be a laminated core, and around which are positioned a plurality of magnetizable elements. The magnetizable elements are arcuate shaped with an inner contour conforming to the outer surface of the core such that the magnets may be adhered to the core, as by an adhesive layer. The magnetizable elements are generally made from barium or strontium ferrite, or samarium cobalt (rare earth). Permanent magnet rotors of this general type find particular application in motors having control circuitry which controls energization of the windings in one or more predetermined sequences to provide rotational magnetic fields and thereby rotation of the rotor. Numerous patents disclosing such rotor applications are identified in U.S. Pat. No. 5,040,286 which is assigned to the assignee of the present invention and incorporated herein by reference. Rotors produced in accordance with the present invention can be used to particular advantage in refrigeration evaporation and condenser fan motor applications where high reliability, high efficiency and long service life are particularly important.

The relative high mass of the materials used to form the magnetic elements and the relatively high rotor speeds, generally in the order of 1000–16,000 RPM, create significant forces during rotor operation, including centrifugal forces and substantial momentum forces upon sudden reversals of rotor rotation. Retention of the magnets in predetermined rotational positions about the core is critical to optimum motor operation. A number of methods and techniques for retaining magnets in fixed relation on the rotor core have previously been considered. One such technique involves positioning the magnetic elements around the core and applying a Kelvar or fiberglass wrap to hold the magnets in place. In this technique, an adhesive filler may be employed to fill voids and provide a more rigid structure, thereby further preventing magnet movement about the core during motor operation.

Another technique for retaining magnets on an associated core in a permanent magnet rotor includes wrapping a relatively fine wire, under tension, around the magnetic elements followed by an adhesive or epoxy coating to protect the wire and "pot" the assembly. Another technique employs a cylindrically shaped shell or "can" which is assembled around the outer peripheral surfaces of the magnets. Various prior methods and techniques for retaining magnets in fixed rotational position on associated cores in permanent magnet rotors are described in greater detail in the aforementioned U.S. Pat. No. 5,040,286.

While many of the prior approaches to retaining magnets on rotor cores has been found satisfactory for their intended applications, many exhibit drawbacks such as difficulty in manufacture and/or assembly, or failure to adequately retain the magnets in fixed rotational position on the rotors during high speed operation and when subjected repeated starting, stopping and reversal of the motor in which the rotor is used.

As described in pending application Ser. No. 863,900, public concern over power consumption, as well as environmental concerns, have among other things lead to increased research and effort in the design of more efficient electrical appliances, including components such as fan motors. Accordingly, a rotor assembly which lends itself to economical manufacturing techniques and use in motor applications which contribute to reduced power consumption and improved environmental conditions would greatly enhance the public well-being.

OBJECT AND SUMMARY OF THE INVENTION

One of the primary objects of the present invention is to provide a novel permanent magnet rotor assembly employing a deep drawn cup-shaped shell to encapsulate a core and plurality of magnetizable elements held circumferentially about the core.

A more particular object of the present invention is to provide a novel method for making a permanent magnet rotor wherein a plurality of arcuate shaped magnetizable elements or segments are held circumferentially about a generally cylindrical core, such as being adhesively adhered thereto, and the core and magnetizable elements are inserted within a deep drawn cup-shaped shell in an interference fit, the shell having a substantially closed end wall and an opposite open end defined by a peripheral edge which is rolled over an end plate to encapsulate the core and elements in fixed relation within the shell.

Another object of the present invention is to provide a novel rotor structure which is extremely durable and relatively economical to manufacture.

Still another object of the present invention is to provide a novel method of assembling a permanent magnet rotor as aforedescribed wherein a deep drawn cup-shaped shell having a substantially closed end wall is positioned on an end of a press shaft within a recess in a stripper plate, a core and arcuate shaped magnetizable elements held about the circumference of the core are positioned in axial aligned relation with an open end of the shell, and a press plate is actuated to cold-press the core and adhered magnetizable elements into the shell while the shell is simultaneously released from the recess.

Another object of the present invention is to provide a novel method and apparatus for encapsulating a rotor core and circumferentially held magnetizable elements within a cup-shaped shell, wherein after pressing the core and magnetizable elements into the shell, an annular end plate is inserted into the open end of the shell and a peripheral edge of the shell is rolled over the periphery of the end plate by means of a roll forming tool to retain the core and magnetizable elements encapsulated within the shell.

A feature of the permanent magnet rotor assembly in accordance with the present invention lies in providing a first electrically nonconducting insulator disk between the closed end wall of the shell and the adjacent ends of the core and magnetizable elements, and a second insulator disk between the annular end plate and the opposite ends of the core and magnetizable elements, whereby to prevent corrosion due to galvanic action.

Another feature of the permanent magnet rotor assembly in accordance with the present invention lies in providing equally circumferentially spaced ribs or tabs on the outer periphery of the core to prevent rotation of the encapsulated magnetizable elements circumferentially relative to the core.

In carrying out the various objects of the present invention, a permanent magnet rotor assembly is provided which includes a substantially cylindrical core having equally circumferentially spaced ribs on its outer circumferential surface. In the preferred embodiment, three arcuate shaped magnetizable elements are held about the outer circumference or periphery of the core between the radial ribs or tabs, as by an adhesive, and further adhesive is applied to fill any gaps between adjacent longitudinal edges of the arcuate elements when positioned about the core. A cup-shaped stainless steel shell is inserted within a cylindrical recess in a stripper plate so that the closed end of the shell rests on an end of a press shaft. An electrically nonconducting insulator disk is inserted into the bottom of the cup-shaped shell after which the assembled rotor and magnetizable elements are positioned in axial alignment with the open end of the shell. A fluid pressure operated press nose is caused to engage exposed ends of the core and magnetizable elements and press them into the shell in an interference fit while simultaneously causing progressive release of the shell from the stripper plate recess. A second insulator disk and an annular stainless steel end plate are placed within the open end of the shell so that the insulator disk lies against the adjacent ends of the core and magnetizable elements. The shell and internal elements are placed on an end of a rotatable spindle and clamped thereagainst as the spindle rotates while a forming tool is moved radially to roll a peripheral edge of the shell over the end plate and encapsulate the core and magnetizable elements in fixed relation within the shell.

Further objects, features and advantages of the permanent magnetic rotor in accordance with the invention, together with the method and apparatus for making same, will become apparent from the following detailed description taken in conjunction with the accompanying drawings wherein like reference numerals designate like elements through the several views.

DETAILED DESCRIPTION

Referring now to the drawings, a permanent magnet rotor constructed in accordance with a preferred embodiment of the present invention is indicated generally at 10 in FIGS. 1–4. The permanent magnet rotor 10, which may be termed a rotor assembly, includes a core 12 having a plurality of equal size magnetizable elements or arcuate segments 14 held about a generally cylindrical outer peripheral or circumferential surface 12a of the core, as by a suitable adhesive. The core and magnetizable elements are encapsulated within an outer cup-shaped metallic shell or "can" 16. In the illustrated embodiment, three magnetizable elements or arcuate segments 14 of substantially equal arcuate length and of substantially equal longitudinal length to the longitudinal length of the core 12 are adhesively secured to the outer cylindrical surface 12a of the core. Each magnetizable element 14 is disposed between a pair of outwardly projecting longitudinally extending ribs or intermittent length tabs formed on the outer surface of the core in equal circumferentially spaced relation, such as indicated at 18a, b and c. The ribs 18a–c assist in preventing rotation of the magnetizable elements relative to the core in the event the adhesive bond between the magnetizable elements and the core breaks or releases when the core and magnetizable elements are encapsulated within the outer shell or can 16.

Figures 1, 2, 3, 4:
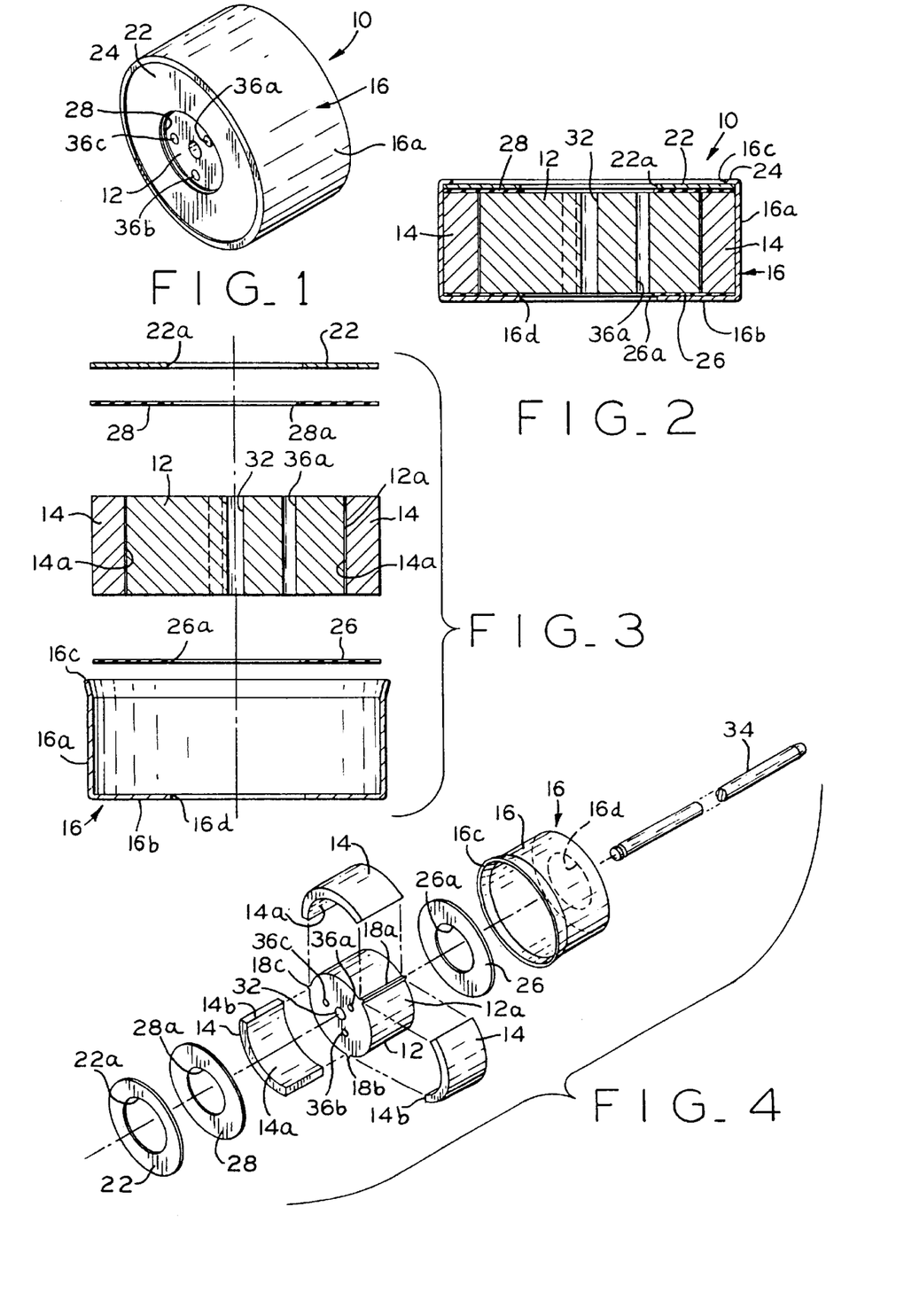
FIG. 1 is a perspective view of a permanent magnet rotor constructed in accordance with the present invention.
FIG. 2 is a longitudinal sectional view through the permanent magnet rotor of FIG. 1 but oriented so that the axis of the rotor extends vertically.
FIG. 3 is an exploded view of the rotor of FIG. 2 with the cup-shaped shell having an outwardly flared upper peripheral edge.
FIG. 4 is an exploded perspective view of the permanent magnet rotor illustrated in FIGS. 1–3.

The cup-shaped shell 16 comprises a deep drawn stainless steel shell or can having an annular wall 16a which terminates at one end in a substantially closed end wall 16b preferably formed integral with the annular wall 16a and which may be planar or slightly inwardly concave. The opposite end of the annular wall 16a has a peripheral edge 16c defining an open end of the shell and which preferably is flared or tapered outwardly relative to the center axis of the annular wall at an angle of approximately 15° to facilitate cold-pressing of the core and magnetizable elements held about the core into the cup-shaped shell. The peripheral edge 16c of the shell 16 is formed generally radially inwardly, as by a rolling or forming operation to be hereinafter described, so as to form a lip 24 which overlies a generally planar annular stainless steel end plate or washer 22 about the full periphery of the end plate as illustrated in FIGS. 1 and 2. During the assembly process, a first electrically non-conducting insulator washer or disk 26 is interposed between the substantially closed end wall 16b of the shell and the adjacent first end of the core 12 and magnetizable elements 14. A second substantially identical electrically nonconducting insulator washer or disk 28 is interposed between the opposite second end of the core 12 and magnetizable elements 14 and the end plate or washer 22. The insulator washers or disks 26, which are preferably made of a suitable plastic material such as Mylar®, insulate the stainless steel shell 16 and end plate 22 from the rotor core to protect both the rotor core and stainless steel shell and end plate from accelerated corrosion that might be caused by galvanic reaction between dissimilar metals.

In the illustrated embodiment, the rotor core 12 may be formed as a solid powdered metal core or a laminated core depending upon the particular application in which the rotor will be used. The rotor 12 has a cylindrical axial bore 32 sized to receive a cylindrical shaft 34 which is adhesively secured in bore 32. The shaft 34 is inserted after completion of assembly of the rotor 10, as when the rotor is utilized in a dynamoelectric machine, such as a motor. Three equal diameter locating holes or bores 36a, 36b and 36c are formed longitudinally through the core 12 so that their axes lie on a common circle concentric to the bore 32. The locating holes or bores 36a–c are equally circumferentially spaced about the rotor axis in predetermined angular relation to the outer ribs 18a–c on the core and serve to enable predetermined orientation of the rotor 10 during magnetizing of the magnetizable elements 14 within a magnetizing fixture, as described in greater detail in U.S. Pat. No. 5,175,462 which is owned by the assignee of the present invention and is incorporated herein by reference. The end wall 16b of the cup-shaped shell 16, and the end plate 22 and insulator disks 26 and 28 have circular apertures formed centrally therethrough, such as indicated at 16d, 22a, 26a and 28a, respectively. The various center apertures 16d, 22a, 26a and 28a are of sufficient diameter to expose the opposite ends of the locating holes or bores 36a–c in the assembled rotor, as illustrated in FIG. 1. Preferably the central apertures 16d and 22a in the shell end wall 16b and end plate 22, respectively, are slightly larger in diameter than the center apertures in the insulator disks or washers 26 and 28 so as to prevent the shell end wall and end plate from contacting the adjacent core end surfaces.

The deep drawn shell or can 16 is preferably made of an 304 annealed stainless steel having a wall thickness of approximately 0.006 inch. The inner diameter of the annular wall 16a of the deep drawn shell, and the outer diameter of a cylindrical envelope containing the outer arcuate surfaces of the magnetizable elements 14 after adhesively securing the magnetizable elements to the core 12, are selected to provide a nominal stretching of the annular wall of the metallic shell of approximately 0.028 inch, with a minimum stretch of approximately 0.016 inch and a maximum stretch of approximately 0.040 inch when the rotor and adhered magnetizable elements are cold-pressed into the shell or, alternatively, when the annular wall of the shell is pressed over the rotor core/magnetizable element assembly. As aforementioned, the flared peripheral edge 16c of the outer shell 16 is preferably provided to guide the rotor core/ magnet assembly into the shell or can, with the longitudinal length or height of the annular sidewall 16a from the end wall 16b to the upper peripheral edge 16c being established to allow optimum roll over of the peripheral edge of the shell onto the periphery of the end plate or washer 22 to form the retaining lip 24.

The rotor magnetizable elements or arcuate segments 14 preferably are made from ferrite material having a density of at least 4.8 grams per cubic centimeter. The magnetizable elements have inner arcuate surfaces 14a having equal nominal radius but having a tri-arc configuration to minimize magnet rock on the outer cylindrical surface of the rotor core. In attaching the magnetizable elements or arcuate segments to the outer surface 12a of the core 12 by an adhesive, an activator, such as Dymax 535 activator, is applied to the inner arcuate surface of each of the magnetizable elements which are then heated. A suitable adhesive, such as Dymax 20012 adhesive, is then applied to the outer circumferential surface of the rotor core 12. Preferably a strip of suitable hot melt adhesive, such as 3M 3748 hot melt adhesive, is then applied to a common one of the longitudinal edge surfaces on each of the magnetizable elements, such as indicated at 14b in FIG. 4. The magnetizable elements are then positioned against the adhesively coated outer surface of the core between the ribs or tabs 18a–c and any excess adhesive is wiped off. The thus assembled core and magnetizable elements are then clamped in a hose clamp, or other suitable assembly fixture such as disclosed in the aforementioned U.S. Pat. No. 5,040,286, for approximately ten minutes to enable the adhesive to set. The adhesive applied to the outer circumferential surface of the core serves to fill any gaps that may exist between the inner surfaces of the magnetizable elements and the outer surface of the rotor core. The hot melt adhesive applied between the mutually opposed longitudinal edge surfaces of each adjacent pair of magnetic elements serves to fill any gaps that may exist between the adjacent magnetizable elements or segments. Sufficient heat may be applied during the clamping process to enable the hot melt adhesive to flow into any gaps between adjacent magnetizable elements.

Figures 5, 6, 10:
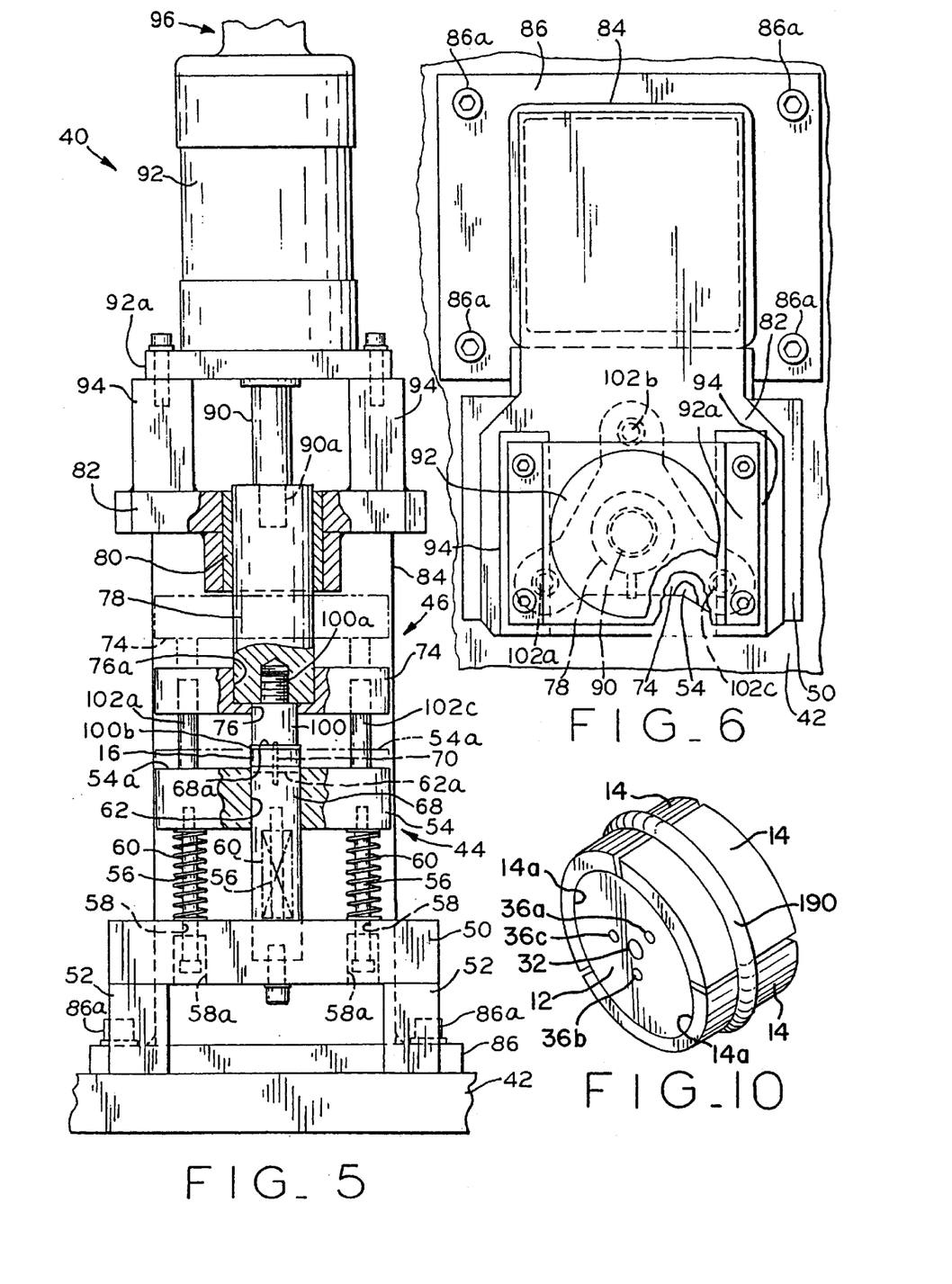
FIG. 5 is a front elevational view of apparatus in accordance with the present invention for assembling a core and adhered magnetizable elements within the cup-shaped outer shell.
FIG. 6 is a plan view of the assembly apparatus of FIG. 5.
FIG. 10 is a perspective view of the rotor core having magnetizable elements held about the outer circumferential surface of the core by an elastic O-ring rather than adhesive.

Referring to FIGS. 5 and 6, apparatus constructed in accordance with the present invention for use in assembling the rotor core 12 and adhesively adhered magnetizable elements 14 into the cup-shaped shell 16 is indicated generally at 40. The apparatus 40, which may alternatively be termed a magnet press, includes a base plate 42 which may be supported on legs or a work bench at a convenient working height. The base plate 42 in turn supports stripper plate means, indicated generally at 44, and press plate means, indicated generally at 46. The stripper plate means 44 includes a stripper base plate 50 which is mounted on the base plate 42 through suitable bolts and spacers 52. A stripper plate 54 is supported by the stripper base plate 50 in a manner to enable vertical movement of the stripper plate relative to the stripper base plate. In the illustrated embodiment, the stripper plate 54 is generally triangular in plan configuration, as illustrated in FIG. 6, and is guided during vertical movement by a plurality of shoulder bolts 56 which extend upwardly through bores 58 and counterbores 58a formed through the stripper base plate 50 such that the upper ends of the shoulder bolts are threadedly secured to the stripper plate generally at its three corners. A coil compression spring 60 is coaxial about each of the shoulder bolts 56 between the stripper base plate 50 and the stripper plate 54 to bias the stripper plate to an upper position, as shown in phantom in FIG. 5, limited by the heads of the shoulder bolts bottoming out within their respective counterbores 58a in the stripper base plate.

The stripper plate 54 has a central longitudinal bore 62 formed therethrough having a chamfer 62a at the intersection of the bore 62 with an upper planar surface 54a of the stripper plate. The bore 62 defines a recess in the stripper plate to receive a deep drawn shell 16 and has a diameter sufficient to slidingly engage the outer surface of the annular wall 16a when the shell is inserted within the bore or recess such that its outwardly flared peripheral edge 16c seats within or extends above the chamfered end 62a of the recess.

An upstanding cylindrical press shaft 68 has its lower end fixed to and supported by the stripper base plate 50 so that the press shaft extends upwardly through the bore or recess 62 centrally of the stripper plate 54. The press shaft 68 has an upper planar support surface 68a lying normal to the axis of the press shaft. The press shaft 68 has a diameter slightly less than the diameter of the cylindrical bore or recess 62 in the stripper plate 54 so as to enable relative sliding movement between the press shaft and the stripper plate 54 during vertical movement of the stripper plate. The length of the press shaft is selected such that its upper support surface 68a is spaced below the upper surface 54a of the stripper plate by a distance equal to approximately the length of the shell 16 between its end wall 16b and the point at which the upper edge 16c flares outwardly from the annular wall 16a, when the stripper plate is in its uppermost position. As will be described, during a press operation the stripper plate is moved downwardly by the press plate means 46 to a position wherein the upper support surface 68a on the press shaft 68 extends slightly above the upper surface 54a of the stripper plate, as shown in solid lines in FIG. 5.

A pilot pin or shaft 70 is mounted on the upper end of the press shaft 68 so as to extend axially upwardly from the support surface 68a. The pilot pin 70 has a diameter slightly less than the diameter of the axial bore 32 formed in the rotor 12. The pilot pin has sufficient length to enable the end wall 16b of a shell 16 to be placed over the pilot pin and supported on the support surface 68a, and then allow a rotor 12 and adhered magnetizable elements 14 to be similarly positioned over the pilot pin 70 in axial alignment with the open end of the shell.

With the stripper plate 54 in its raised position, as shown in phantom in FIG. 5, a recess is established in the bore 62 of sufficient depth to receive a shell 16 with its substantially closed end 16b supported on the support surface 68a and with its upper flared end 16c extending slightly above the upper surface 54a of the stripper plate. After placing a rotor 12 and adhered magnetic elements 14 over the pilot pin 70 such that the pilot pin is received within the bore 32 in the core, the press plate means 46 is actuated to press the core and magnetizable elements into the shell 16 while simultaneously causing progressive ejection or release of the shell from the recess 62 as the core and magnets are pressed into the shell. To this end, the press plate means 46 includes a press plate 74 which is generally triangular in shape similar to the stripper plate 54. The press plate 74 has planar upper and lower surfaces and has a central or axial bore 76 formed therethrough with an axial counterbore 76a which receives the lower end of a cylindrical support shaft 78 to which the press plate is suitably affixed. The support shaft 78 extends upwardly in sliding relation with a suitable bushing 80 fixed within a press support plate 82 in vertical axially aligned relation with the press shaft 68. The press support plate 82 is generally rectangular in plan configuration and is affixed to and supported in generally horizontal cantilever fashion by an upstanding support frame 84 which is affixed to the base plate 42 through a rectangular base 86 and suitable screws 86a disposed at the corners of base 86.

The end of the support shaft 78 opposite the press plate 74 is secured to the lower threaded end 90a of a longitudinally extendable piston rod 90 which extends from and forms a part of a double acting hydraulic cylinder 92. The cylinder 92 is supported on the press support plate 82 through a mounting flange 92a and a pair of spacer blocks 94 so that the axis of the piston rod 90 is axially aligned with the press shaft 68. Hydraulic fluid is ported to upper and lower ends of the cylinder 92 under the control of a solenoid valve (not shown) controlled by a pressure sensor (not shown) responsive to the pressure applied to the core/magnets as they are pressed into the shell 16. The pressure sensor senses when the core/magnets have been fully pressed into the cup or shell 16, i.e. bottomed out, and causes the support shaft 78 to be raised to its upper retracted position. Preferably, a time delay is provided to delay raising of the support shaft 78 for a short period, such as a second or so, after the core/magnets have bottomed out in the cup-shaped shell 16. A hydrocheck 96 of known design, such as commercially available from Schrader Bellows Company, is mounted on the cylinder 92 and pneumatically pressurizes the hydraulic fluid which actuates the cylinder 92, thus providing an "air over oil" system, as is known.

The lower end of the support shaft 78 carries a generally cylindrical press nose piece 100 which is received within the bore 76 in the press plate 74 and has a reduced diameter threaded end 100a which threadedly engages a threaded axial bore in the lower end of the support shaft 78. The nose piece 100 has an outer diameter slightly less than the inner diameter of the annular wall 16a of the deep drawn shell 16. The press plate 74 carries three equal length spacer pins 102a–c which extend downwardly from the lower surface of the press plate 74. The spacer pins are positioned to engage the upper surface of the stripper plate 54 and effect downward movement of the stripper plate in predetermined relation to downward movement of the press plate 74 responsive to actuation of the actuating cylinder 92. The length of the spacer pins 102a–c from the lower surface of the press plate 74 is established so that a lower planar press surface 100b on the nose piece 100 is never closer to the upper surface of the stripper plate 54 than a distance slightly greater than the longitudinal length of the shell 16 measured from its bottom wall to the upper peripheral edge 16c in its outwardly flared condition. Such spacing is held to ensure that the shell or cup 16 is held concentric with the rotor core/magnetizable elements during pressing of the rotor and magnetizable elements into the shell, and to insure bottoming out of the core/magnets against the insulator disk 26 and end wall 16b.

In the operation of the magnet press apparatus 40, and with the stripper plate 54 and press plate 74 in their upper positions, as shown in phantom in FIG. 5, the upper surface of the stripper plate will lie in a plane spaced above the support surface 68a on the press shaft 68, thereby establishing a recess within the stripper plate. A deep drawn stainless steel shell or can 16 is then inserted into the recess 62 with the lower end wall 16b of the shell resting on the press shaft support surface 68a. As aforedescribed, in this position, the flared upper peripheral edge 16c of the shell extends above the upper surface of the stripper plate.

An annular insulator washer 26 is then placed into the shell against the bottom wall 16b. The rotor 12 having magnetizable elements 14 adhered to its outer peripheral surface, as aforedescribed, is then placed on top of the flared end 16c of the shell using the pilot pin 70 to guide the core/magnets into axial alignment with the shell. The actuating cylinder 92 is then actuated to move the support shaft 78 and associated nose piece 100 downwardly such that the nose piece engages the core/magnetizable elements. At substantially the same time, the lower ends of the spacer pins 102a–c engage the upper surface of the stripper plate 54 and begin to move it progressively downwardly against the biasing action of the springs 60. Since the upper support surface 68a on the press shaft 68 is fixed relative to the stripper base plate 50, such progressive downward movement of the stripper plate 54 causes progressive release or ejection of the shell from the recess 62 as the core/magnets are pressed into the shell and effect stretching of the annular wall 16a over the outer surfaces of the magnets in a cold-press operation. The cylinder 92 is controlled to move the press plate 74, and thereby the stripper plate 54 through the action of the spacer pins 102a–c, downwardly a sufficient distance to fully press the core/magnet assembly into the shell against the insulator disk disposed adjacent the end wall of the shell. Since the annular wall 16a of the shell is stretched radially outwardly upon insertion of the core/magnets, return of press plate 74 to its upper position through reverse actuation of the cylinder 92 allows the springs 60 to return the stripper plate 54 to its upper position with the assembled shell and core/magnets resting within the chamfered edge 62a of the bore 62, thereby enabling the assembled shell and core/magnets to be readily lifted off the pilot pin 70 for completion of the assembly process.

Figures 7, 9:
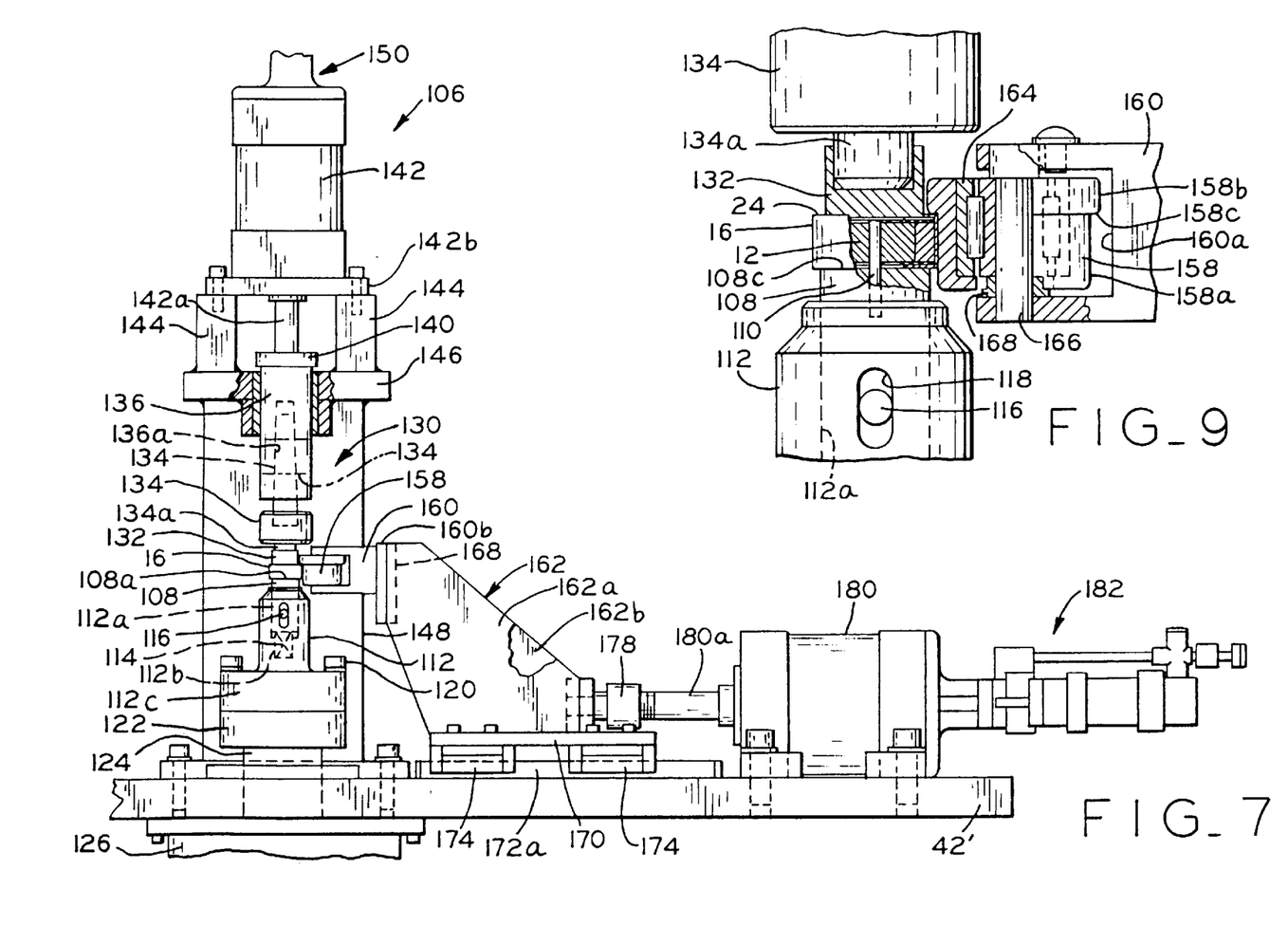
FIG. 7 is a front elevational view of apparatus for forming a peripheral edge of the cup-shaped outer shell over an upper end plate or disk to encapsulate the various core and magnetizable components within the shell.
FIG. 9 is a fragmentary elevational view, on an enlarged scale, showing the roll forming tool during rolling of the upper edge of the outer shell.
Figure 8:
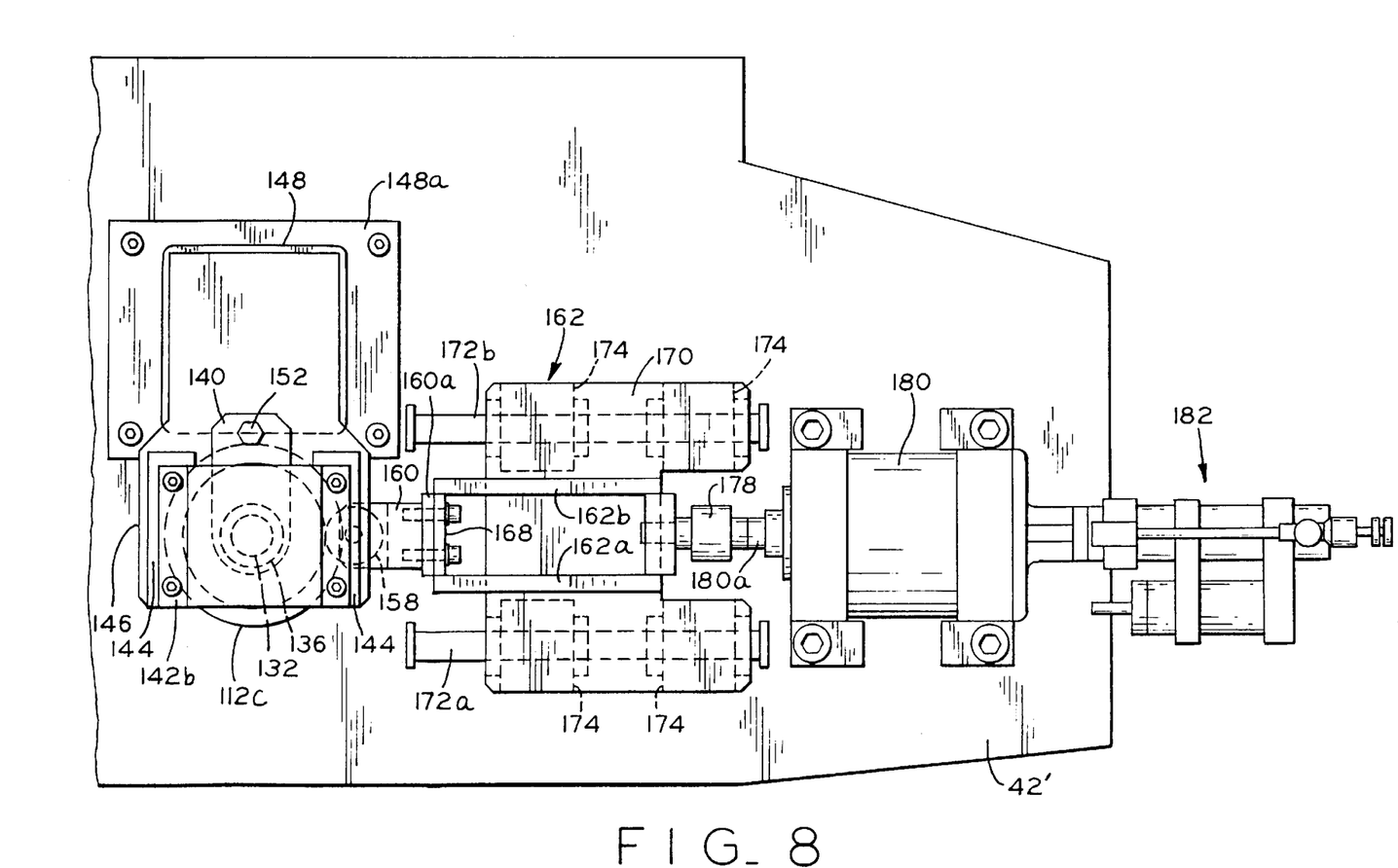
FIG. 8 is a plan view of the assembly apparatus of FIG. 7.

After pressing the core 12 and adhered magnetizable elements 14 into the shell or can 16 with an insulator disk 26 interposed between the end wall of the shell and the core/magnets, the second insulator disk 28 and stainless steel annular washer or end plate 22 are placed on the exposed ends of the core and magnets, and the peripheral edge 16c is formed over the outer periphery of the end plate to form the retaining lip 24 and encapsulate the core/magnets within the outer shell or can. Referring to FIGS. 7–9, apparatus for forming the peripheral edge 16c over the end plate to form the lip 24 is indicated generally at 106. The apparatus 106, which may alternatively be termed the lip rolling apparatus, includes a base plate 42' which may form a lateral extension of the aforedescribed base plate 42 and is also supported at a convenient height for operator use of the apparatus 106. After removing the cup-shaped shell 16 and cold-pressed core/magnets from the press apparatus 40, the shell and internal core/magnets are placed on a horizontal support surface 108a formed on the upper end of a cylindrical rotor core support member 108. A pilot pin or shaft 110 is mounted on the upper end of the rotor core support 108 so as to extend axially upwardly from the support surface 108a. The pilot pin 110 is received within the center bore 32 in the core 12 when positioned onto the support surface 108a, thus maintaining the shell core/magnets in axial alignment with the core support 108.

The cylindrical rotor core support member 108 is longitudinally slidable within a bore 112a formed axially in a rotatable spindle adapter 112. A coil compression spring 114 is disposed within a blind bore 112b coaxial with and intersecting the bore 112a and acts against the lower end of the rotor core support 108 to bias it upwardly to an uppermost position wherein a cross pin 116 through the rotor core support engages the upper ends of a pair of diametrically opposed elongated slots 118 formed in the spindle adapter 112. The spindle adapter 112 has a mounting flange 112c which is connected through cap screws 120 to a drive flange 122 formed on or fixed to the upper end of the drive shaft 124 of a suitable electric drive motor suspended below the base plate 42', a fragmentary portion of the motor being indicated at 126.

After positioning the shell 16 and internal core/magnets over the pilot pin 110 and onto the upper surface 108a of the rotor core support 108, the upper insulator disk 28 and stainless steel annular end plate 22 are placed on the upwardly exposed ends of the core 12 and magnetizable elements. Clamp means, indicated generally at 130, are then actuated to clamp the shell, core/magnets and end plate against the rotor core support to establish a relatively fixed clamped relation therebetween during rotation of the spindle adapter 112. In the illustrated embodiment, the clamp means 130 includes a generally cylindrical clamp nose 132 which is fixed on a reduced diameter end 134a of a conventional live center 134, such as a No. 3 Morse taper live center. The live center 134 has a tapered shank 134b which is retained within a suitable tapered bore 136a formed axially in a cylindrical support shaft 136. The upper end of the support shaft 136 is connected to a generally rectangular adjustment bar or plate 140 through suitable cap screws. The adjustment bar 140 is in turn secured to the lower end of a longitudinally extendable piston rod 142a of a double acting hydraulic cylinder 142. The cylinder 142 is mounted through a mounting flange 142b and a pair of spacer blocks 144 to a horizontal clamp support plate 146 so that the axis of the piston rod 142a and the axis of the live center 134 are axially aligned with the axis of rotation of the spindle adapter 112. The clamp support plate 146 is generally rectangular and supported in cantilever fashion by an upstanding support frame or column 148 mounted at its lower end on the support plate 42' through a mounting flange 148a, as illustrated in FIG. 8.

The double acting hydraulic cylinder 142 is similar to the aforedescribed double acting cylinder 92 wherein hydraulic fluid lines connected to upper and lower inlet/outlet ports of the double acting cylinder are selectively connectable to a source of pressure or to atmosphere pressure through a hydro-check control assembly 150 similar to the aforedescribed hydro-check control 96. A solenoid control valve (not shown) is responsive to an operator initiated signal to actuate cylinder 142 and move the clamp nose 132 downwardly to initiate a clamping operation.

Downward movement of the live center 134 from its upper retracted position, as illustrated in phantom in FIG. 7, is limited by an adjustment bolt 152 and associated locknut carried by the adjustment bar or plate 140 and adjusted relative to the adjustment bar so that the lower end of the bolt engages the clamp support plate 146 when the clamp nose 132 has been moved downwardly a predetermined distance into clamping relation with the end plate 22 overlying the exposed ends of the core and magnetizable elements within the shell 16.

With the shell 16 and internal core/magnets, insulator disks and upper end plate 22 clamped between the rotor core support 108 and the clamp nose 132 on the live center 134, the core support and spindle adapter are rotated by energizing the drive motor 126 to a suitable rotational speed such as 300 rpm. Forming means in the form of a generally stepped cylindrical roll forming tool 158 is then moved radially against the outwardly tapered peripheral edge 16c of the shell 16 to effect rolling of the full circumferential length of the edge 16c over the periphery of the end plate 22 to form the lip 24 and encapsulate the core/magnets within the outer shell 16.

Referring to FIG. 9, the roll forming tool 158 is rotatably supported within a recess 160a of a forming tool holder 160 which is secured to and movable with a horizontally movable carriage 162. The roll forming tool 158 is supported by the tool holder 160 for rotation about a vertical rotational axis through a suitable sealed roller bearing 164 the inner race of which is mounted on a support shaft 166. A stepped spacer 168 maintains the roll forming tool 158 placed between the arms of the tool holder 160 to enable free rotation. The outer periphery of the roll forming tool 158 has a cylindrical surface 158a which is stepped to an upper larger diameter annular surface 158b through an annular convex forming surface 158c having a uniform radius cross-sectional curvature.

The forming tool 158 is supported such that when the clamp nose 132 is in its lowered clamping position against the upper end plate 22 on the rotor core/magnets, horizontal movement of the forming tool 158 radially of the axis of the shell 16 effects engagement of the outwardly convex forming surface 158c with the flared peripheral edge 16c of the shell and rolls the edge of the shell over onto the periphery of the end plate 22 to encapsulate the core/magnets within the outer shell or cup 16.

The carriage 162 is operative to effect the aforedescribed movement of the forming tool 158. To this end, the carriage 162 has a substantially vertical mounting plate 168 supported by and between a pair of parallel upstanding carriage plates 162a and 162b. The forming tool holder 160 has a mounting flange 160b which is secured in face-to-face relation with the carriage mounting flange 168 through suitable mounting screws. The upstanding carriage plates 162a,b are fixed at their lower edges to a generally horizontal carriage plate 170. The carriage plate 170 is in turn mounted on a pair of parallel rails or guideways 172a and 172b through conventional slide bearings 174 secured to the lower surface of the carriage plate 170 generally adjacent the corners thereof, as illustrated in FIG. 8. The rails or guideways 172a,b are fixed to the upper surface of the base plate 42' and have their longitudinal axes perpendicular to a vertical plane containing the center axes of the spindle adapter 112 and the adjustment bolt 152.

To effect reciprocating movement of the carriage 162 and roll forming tool 158 radially of the clamped cup-shaped shell 16 and internal core/magnets, the carriage is connected through an alignment coupler 178 of known design to a longitudinally extendable piston rod 180a of a double-acting hydraulic cylinder 180 which is fixedly mounted on the base plate 42 such that the axis of the piston rod lies in a vertical plane containing the rotational axis of the roll forming tool 158. The double-acting hydraulic cylinder 180 is similar to the aforedescribed actuating cylinders 92 and 142 and has a hydro-check pneumatic control, indicated generally at 182, operative to pressurize the hydraulic fluid for actuation of the cylinder 180 under the control of a solenoid operated control valve (not shown). The solenoid control valve may be responsive to either manual or automatic control to initiate movement of the roll forming tool 158 from a retracted non-operating position to a position effecting full rolling or forming of the flared edge 16c of the shell 16 to form the rim 24 onto the periphery of the end plate. After forming the full rim 24, the roll forming tool is retracted under the control of a forming tool position sensor and timer means (not shown) to effect reverse movement of the piston 180a.

Upon completion of a rolling operation to form the lip 24 over the end plate 22 to encapsulate the internal core/magnets within the shell 16, the cylinder 142 is actuated to retract or raise the clamp nose 132 from the completed rotor and enable removal of the assembled rotor from the pilot pin 110.

The permanent magnet rotor 10 has been thus far described as having the magnetizable elements 14 held about the outer circumferential surface 12a of the core 12 between the longitudinal ribs 18a–c by an adhesive as the core and magnetizable elements are cold-pressed into the cup-shaped shell or can 16. FIG. 10 illustrates an alternative technique for holding a plurality of magnetizable elements 14 about the outer circumferential surface of a core 12 as the core and magnetizable elements are assembled into a cup-shaped shell or can 16, as by cold-pressing with the magnet press apparatus 40. As shown in FIG. 10, three magnetizable elements 14 are retained firmly about the outer circumferential surface of the core 12 by an elastic O-ring 190 so that each magnetizable element lies between a pair of the longitudinal ribs 18a–c. The O-ring 190 is preferably made of a suitable elastomeric material which allows the O-ring to be stretched or expanded circumferentially over the magnetizable elements after they are placed about the core so that the O-ring retains the magnets firmly against the core.

With the core 12 having magnetizable elements 14 held against its outer circumferential surface by the O-ring 190 as illustrated in FIG. 10, the core and magnetizable elements may be placed coaxially on top of the flared end 16c of a shell 16 which has been inserted into the recess 62 in the stripper plate 54 of the press apparatus 40 in similar fashion to the aforedescribed core 12 having magnetizable elements adhesively adhered to its outer circumferential surface. The actuating cylinder 92 may then be actuated to move the nose piece 100 downwardly to engage the core and magnetizable elements while simultaneously moving the stripper plate 54 progressively downwardly. As described, this causes progressive ejection of the shell 16 from the recess 62 as the core and magnets are pressed into the shell in a cold-press operation. As the core and magnetizable elements are pressed into the shell, the O-ring 190 will either roll over the outer periphery of the shell, from which it can be readily removed, or will be pushed along the outer surfaces of the magnetizable elements until it releases from the magnetizable elements, leaving the core and magnetizable elements assembled into the shell.

Thus, in accordance with the present invention, a permanent magnet rotor for use in an electrically commutated motor is provided which employs a deep drawn metallic shell or can having a substantially closed end wall and an opposite open end into which a core and magnetizable elements held about the circumferential surface of the core are cold-pressed and insulator disks and an end plate are positioned prior to rolling an outwardly tapered peripheral edge of the shell over the periphery of the outer end plate to encapsulate the rotor and magnetic elements within the outer shell. Magnet press apparatus is provided which efficiently and accurately cold-presses the core and magnetic elements within the deep drawn shell while maintaining the shell concentric with the outer surfaces of the magnets during the cold-pressing operation. Roll forming apparatus is provided to efficiently roll the outwardly flared peripheral edge of the deep drawn shell or cup over the stainless steel end plate to fully encapsulate the core and magnetic elements within the shell with insulator disks interposed between the shell and end plate and the rotor core to substantially prevent corrosion from galvanic action.

While a preferred embodiment of a permanent magnet rotor constructed in accordance with the present invention, along with a preferred method and apparatus for making the rotor, have been illustrated and described, it will be understood to those skilled in the art that changes and modifications may be made therein without departing from the invention in its broader aspects. Various features of the invention are defined in the following claims.

What is claimed is:

1. A method of making a permanent magnet rotor comprising the steps of:
   a. forming a generally cylindrical core having first and second ends and an axial bore intersecting said ends;
   b. forming a plurality of substantially identically shaped magnetizable elements each of which has an arcuate transverse cross-sectional configuration;
   c. forming a cup-shaped deep drawn metallic shell having a relatively thin annular wall terminating at one end in an end wall having a generally circular central aperture at least as large in area as the cross-sectional area of said core axial bore, said shell having an opposite open end defined by a peripheral edge, said end wall being formed integrally with said annular wall and having a thickness substantially the same as the annular wall;
   d. elastically holding the magnetizable elements against an outer circumferential surface of the core;
   e. positioning the deep drawn shell in a generally fixed orientation;
   f. inserting an annular electrically nonconducting insulator disk into said shell against said end wall, said insulator disk having a generally circular center aperture not substantially greater in area than said central aperture in said end wall;

g. positioning the core and magnetizable elements in axial alignment with the open end of said shell, said magnetizable elements having outer surfaces lying in a common generally cylindrical envelope having a diameter to establish an interference fit with an inner surface of the annular wall of said shell;

h. effecting relative axial movement between said core and magnetizable elements and said shell to fully cold-press said core and elements into said shell so that the shell firmly retains the magnetizable elements against the core and so that the first end of the core is positioned adjacent said insulator disk and said peripheral edge of the open end of said shell extends longitudinally outwardly from the second end of said core and said magnetizable elements;

i. positioning an annular end plate within said open end of said shell over the second end of said core and magnetizable elements; and j. forming said peripheral edge of said shell over an outer periphery of said end plate to encapsulate said core and magnetizable elements within said shell.

2. The method as defined in claim 1 wherein said shell and end plate are made from stainless steel.

3. The method as defined in claim 1 wherein said annular wall is formed to effect an interference fit in the range of approximately 0.016–0.040 inch.

4. The method as defined in claim 1 including the further step of inserting a second annular electrically nonconducting insulating disk against the second end of said core and said magnetizable elements before positioning said end plate within the open end of said shell.

5. The method as defined in claim 4 wherein said first and second insulating disks are made of plastic.

6. The method as defined in claim 4 wherein said end plate and first and second insulating disks are formed with annular configurations so as to expose opposite ends of said axial bore.

7. The method as defined in claim 1 including the steps of forming a plurality of longitudinal outwardly facing ribs on the outer circumferential surface of said core, said step of holding said magnetizable elements to the outer peripheral surface of said core including positioning each of said elements between a different pair of said ribs, and applying an adhesive between adjacent longitudinal side edges of said magnetizable elements.

8. The method as defined in claim 1 including the step of forming said shell to flare outwardly at said peripheral edge to facilitate cold-pressing of said core and magnetizable elements into said shell.

* * * * *